United States Patent [19]

Guldenfels et al.

[11] 4,004,706
[45] Jan. 25, 1977

[54] CYLINDRICAL RECEPTACLE OF FIBER-REINFORCED PLASTIC AND METHOD OF MANUFACTURING A RECEPTACLE

[75] Inventors: Willi Guldenfels, Neuallschwil, Switzerland; Börge Ingmar Carlström, Hoganas, Sweden

[73] Assignee: Basler Stuckfarberei AG, Switzerland

[22] Filed: Oct. 11, 1973

[21] Appl. No.: 405,286

[30] Foreign Application Priority Data

May 28, 1973    Switzerland .................... 7688/73

[52] U.S. Cl. .............................. 220/3; 220/5 A;
220/9 LG; 220/9 M; 220/68; 220/71;
220/DIG. 23; 220/83
[51] Int. Cl.² .................................... B65D 25/14
[58] Field of Search ............. 220/5 R, 5 A, 3, 9 M,
220/11, 9 LG, 83, 15, 64, 68, DIG. 23

[56] References Cited

UNITED STATES PATENTS

| 746,440 | 12/1903 | Austin | 220/5 |
|---|---|---|---|
| 1,835,699 | 12/1931 | Edmonds | 220/9 LG |
| 3,073,475 | 1/1963 | Fingerhut | 220/3 |
| 3,566,824 | 3/1971 | Cuneo | 220/9 LG |
| 3,700,512 | 10/1972 | Pearson et al. | 220/5 A |

FOREIGN PATENTS OR APPLICATIONS

| 234,484 | 7/1961 | Australia | 220/9 LG |
|---|---|---|---|
| 636,523 | 2/1962 | Canada | 220/15 |
| 1,381,477 | 11/1964 | France | 220/9 LG |
| 840,952 | 7/1960 | United Kingdom | 220/9 LG |
| 833,613 | 4/1960 | United Kingdom | 220/15 |
| 1,183,891 | 1/1969 | United Kingdom | 220/15 |

*Primary Examiner*—William Price
*Assistant Examiner*—Joseph M. Moy
*Attorney, Agent, or Firm*—McGlew and Tuttle

[57] ABSTRACT

A receptacle comprises a circularly cylindrical wall having a closing end wall connected to each end. All of the walls are made of a fiber reinforced plastic resin material and the circularly cylindrical wall has at least two radially spaced layers with at least one of the layers having reinforcing glass fibers therein oriented in a circumferential direction with an intermediate layer between the spaced layers containing a mineral granular material embedded in the resin. The vessel is made either by forming a completely cylindrical intermediate wall and joining rounded end sections to the intermediate wall at each end by an overlapping joint or by an abutting joint which is closed on the exterior by an encircling band. Alternately, the separately fabricated end parts may be joined together by centrifugally forming an intermediate circularly cylindrical wall between them. The circularly cylindrical intermediate wall may also be formed as two separate parts integral with the end formations which are subsequently arranged in end-to-end abutting relationship and joined together and preferably secured at their exterior by an encircling band.

11 Claims, 7 Drawing Figures

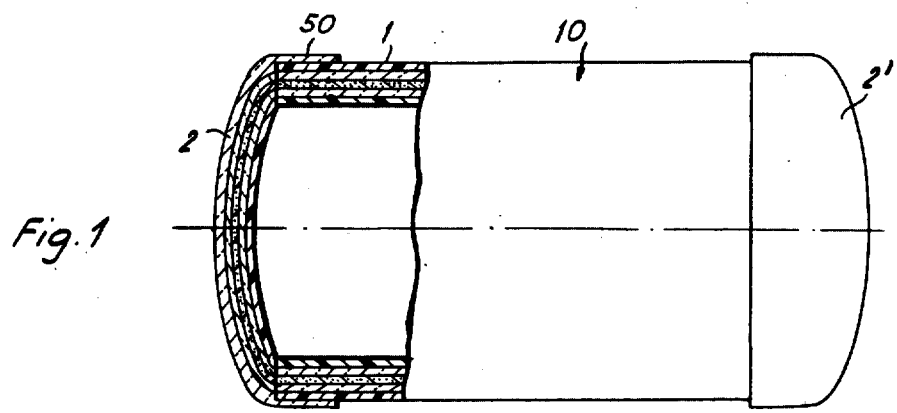
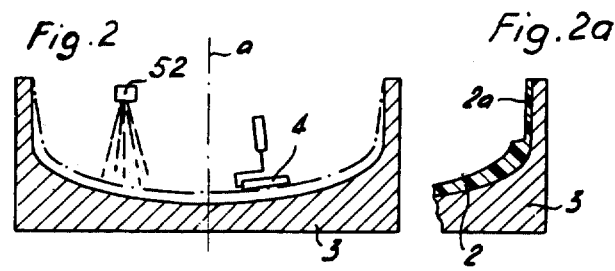
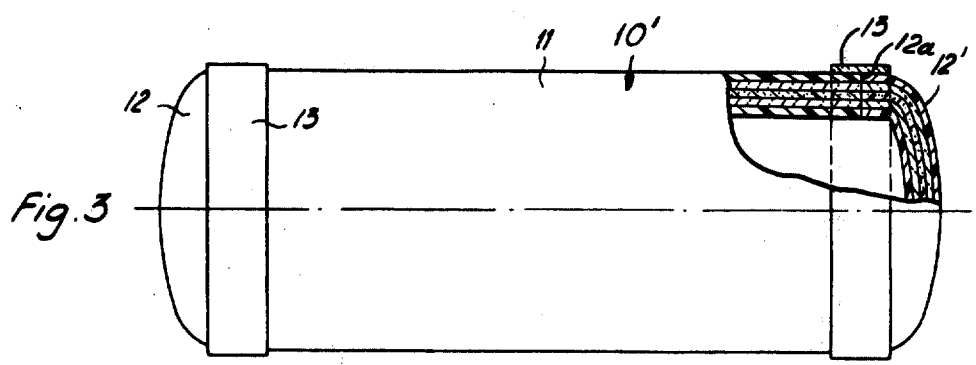
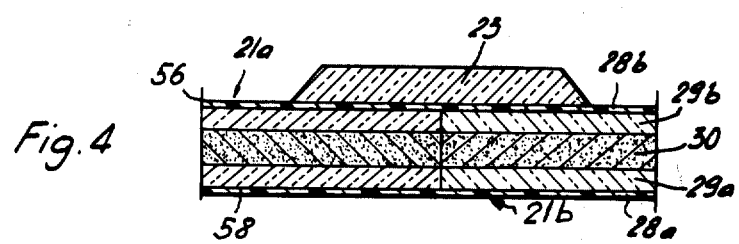

CYLINDRICAL RECEPTACLE OF FIBER-REINFORCED PLASTIC AND METHOD OF MANUFACTURING A RECEPTACLE

BACKGROUND OF THE INVENTION

1. Field of the Invention

This invention relates in general to the construction of vessels or receptacles which are made of a reinforced plastic material and, in particular, to a new and useful vessel having a circularly cylindrical wall made of a fiber reinforced plastic material and which includes at least two radially spaced layers with an intermediate layer of a plastic with a mineral filler therein and with fibers in one of the outer layers being oriented in a circumferential direction and also to a method of making a reinforced plastic vessel.

2. Description of the Prior Art

In the manufacture of plastic tubes such as sewage water conduits, it is well-known to embed the reinforcement fibers, for example, glass fibers, in certain radial zones of the tube wall and to embed mineral granular material for example, sand, in other radial zones. Cylindrical receptacles closed on both ends, such as tanks or the like, for storing or shipping of liquids (for example of liquid fuels, chemical substances, etc.) have not been manufactured in this manner because normally, they are either too expensive or the construction has only a small degree of security. In consequence, the invention is based on the problem of providing a cylindrical receptacle meeting all of the require for the security of such containers.

SUMMARY OF THE INVENTION

In view of this purpose, the receptacle, in accordance with the invention, is characterized in that the wall of its cylindrical part is provided, in at least two radially spaced zones or layers with a reinforcement of glass fiber pieces which, at least in one of these zones, are at least approximately oriented in the circumferential direction of the cylindrical part.

Advantageously, the fiber pieces oriented in the circumferential direction are longer than 5 cm. in order to obtain favorable resistance values due to sufficiently extended bonds within the material. It has been found that a particularly advantageous structure of this type is one in which a zone or layer filled with granular material is provided between two glass fiber-reinforced zones. The ratio of the wall thickness to the diameter is between 0.008 and 0.02 (for diameters, for example, between 90 and 350 cm), and the weight percentage of the glass fibers is between 5 and 25%, in which case the elasticity moduli are, in the circular direction, between about 75,000 kg/cm$^2$ and 150,000 kg/cm$^2$ and, in the axial direction, approximately half of these values.

The method of manufacturing such a receptacle is characterized in that the wall thickness of the cylindrical part of the receptacle is formed, at least partly, in a rotating mold by centrifuging a material consisting of a thermosetting plastic, glass fiber pieces and a granular filler which are supplied during the operation in conformity with the desired structure of the wall. Advantageously, the glass fibers are cut into pieces of the desired length only immediately before they are fed into the mold.

According to its length, which may be between 5 and 15 m, the receptacle is assembled of two or more separately manufactured parts. The end walls may be molded integrally with the cylindrical part or connected thereto as prefabricated parts simultaneously with the manufacture of the cylindrical part or they may be manufactured as finished separate parts and subsequently secured to the finished cylindrical parts in a separate operation. Although it is possible to manufacture a receptacle by applying the different materials (plastic, glass, granular filler) to a rotating core, the centrifugal molding with the use of a rotating whole mold has proven to be a particularly appropriate manufacturing process, not only for the subsequent mounting of the end walls, but also for the simultaneous connecting or integral molding thereof, especially when the cylindrical part of the receptacle is made of two or more pieces.

Of course, the wall of the receptacle may also comprise more than two glass fiber-reinforced zones separated by granular filler zones and cover layers may be provided both on the inside and the outside. The glass fiber pieces may be embedded in radially well defined layers. However, it is also possible to control the feeding of the glass fibers during the formation of the wall so as to obtain a continuous transition between a glass fiber containg and a glass-fiber-free zone.

It is further possible, to provide the cylindrical part of the receptacle subsequently, on the inner or outer side, with a wound plastic-impregnated glass fiber layer. Such a layer may also be provided for uniting two or more cylindrical parts of the receptacle or a cylindrical receptacle part with one or both end walls.

Accordingly, it is an object of the invention to provide a cylindrical receptacle which is made of a fiber reinforced plastic and which comprises a plurality of radially extending wall layers with at least two radially spaced layers having a reinforcement of glass fiber pieces with at least one of the layers having the fibers oriented circumferentially.

A further object of the invention is to provide a vessel of a plurality of layers which includes an intermediate plastic layer having a mineral granular material filler between two layers having reinforcing fibers with the fibers of at least one of the layers being oriented in a circumferential direction.

A further object of the invention is to provide a method of manufacturing a vessel using a rotatable circularly cylindrical mold which comprises centrifugally forming a cylindrical vessel wall part by adding a settable plastic to the mold and rotating the mold to form a plurality of circularly cylindrical wall layers, adding reinforcing fibers to some of the layers during the rotation and orienting the fibers of at least some of the layers so that they extend in a circumferential direction, and separately forming at least one end part of the vessel and joining the separately formed part to said centrifugally formed part by arranging them in end-to-end relationship and sealing them together.

A further object of the invention is to provide a vessel which is simple in design, rugged in construction and economical to manufacture.

BRIEF DESCRIPTION OF THE DRAWINGS

In the Drawings:

FIG. 1 is a partial side elevational and partial axial sectional view of a tank constructed in accordance with the invention;

FIG. 2 is a sectional view of a mold indicating the steps of applying plastic thereto to form the circularly cylindrical vessel;

FIG. 2a is a partial view similar to FIG. 2 showing the end formation of the vessel in greater detail;

FIG. 3 is a view similar to FIG. 1 of another embodiment of the tank;

FIG. 4 is an enlarged partial sectional view of a joint of a tank such as shown in FIG. 3 and indicating the wall construction of the tanks of the invention;

Figure 5:
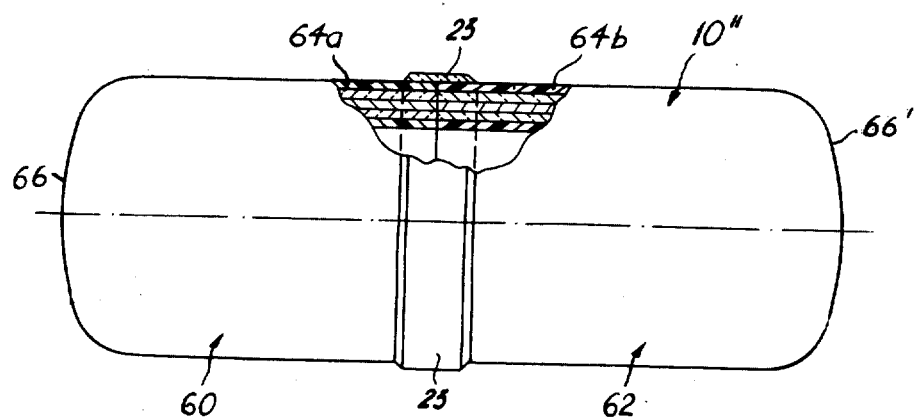
FIG. 5 is a view similar to FIG. 1 of still another embodiment of the invention.

For an understanding of the principles of the invention, reference is made to the following description of typical embodiments thereof as illustrated in the accompanying drawings.

GENERAL DESCRIPTION OF THE PREFERRED EMBODIMENTS

Referring to the drawings in particular, the invention embodied therein in FIG. 1, comprises a vessel, generally designated 10, which includes a circularly cylindrical intermediate wall part 1 and end wall parts 2 and 2' which are joined to the intermediate wall and sealed thereto. In this embodiment, the two end parts 2 and 2' are formed separately, for example, such as by applying plastic into a mold 3 and rotating the mold about a vertical axis $a$ where they may be formed in any other suitable fashion. As shown in FIG. 1, the end parts 2 and 2' are connected to the intermediate circularly cylindrical part 1 by an overlapping joint 50 in which the overlapped ends 2 and 2' are sealed to the wall part 1 such as by cementing or fusing. The end parts 2 or 2' may be manufactured by a compression molding or in the spraying operation indicated in FIG. 2 where the individual layers are successively formed up to the desired wall thickness. The layers may be planished by a roller 4. Alternatively, the walls are formed by the centrifuging in which the mold 3 is rotated about the axis $a$. In this latter process, it is possible to pour a so-called Woods alloy in a hot liquid state into the mold 3. This metal bath forms a parabolic surface onto which the glass fibers and the plastic are subsequently applied by spraying from a spray nozzle 52. Because of the rotation, a layer corresponding to the metal surface will be formed. Since the metal has a considerably greater specific weight than the glass fibers, the fibers do not penetrate into the metal surface. After the plastic is set, the shape is maintained and the finished end wall can be easily removed from the mold.

As shown in FIG. 2a a cylindrical joint surface 2a may be formed, for example, by turning the finished end part 2.

Figure 6:
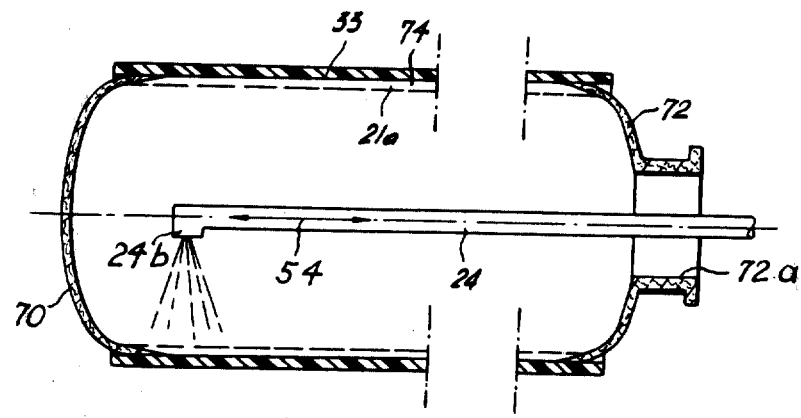
FIG. 6 is an axial sectional view indicating the application of the plastic to a rotatable mold in order to join the end formations of the vessel to a centrifugally formed wall part.

The cylindrical part 1 of the tank is advantageously formed by centrifugal molding in a rotatable hollow mold into which the material to be deposited, such as plastic, glass fiber and sand, is fed through a distributing head which can be reciprocated within the mold in an axial direction as indicated in FIG. 6 by the double arrows 54.

The formation of the wall 1 is such that the glass fiber pieces are concentrated in at least two radially spaced zones of the wall and the zone between these radially spaced zones is formed of a plastic bound granular filler. Three or more such glass fiber reinforced radial zones may also be provided with adjacent ones being separated by an intermediate zone containing the granular filler.

In accordance with a feature of the invention, the feeding and the length of the glass fiber reinforcing pieces is such that at least in one of the reinforced zones, the glass fiber pieces are oriented in the circumferential direction of the cylindrical part 1. This condition is particularly easy to obtain when the glass fiber pieces are relatively long, that is they have a length which is greater than 4 cm and preferably longer than 10 cm. With the fiber pieces of such a length, the bonding with the plastic resin material ensures a considerable resistance to the internal pressures which can be obtained with the vessel constructed in this manner.

The glass fiber percentage is chosen from between 10 and 15% by weight in the associated layer. Under these circumstances, a bending strength in a circumferential direction may be obtained which amounts to from 2000 $kg/cm^2$ measured from the outside inwardly to about 1,500 $kg/cm^2$ measured from the outside inwardly. In both cases, the ratio of the wall thickness to the diameter is from between 0.008 to 0.02. The axial resistance measured in centimeters of width should be approximately 200 kg/cm and the modulus of elasticity in the circumferential direction for a glass content of about 15% is preferably about 100,000 $kg/cm^2$.

In FIG. 3, a tank 10' includes an intermediate circularly cylindrical portion 11 which is joined at each end to end portions 12 and 12', respectively. The cylindrical part 11 is manufactured in one piece and is closed on each end by the associated end wall part 12 or 12'. The end walls 12 and 12' are not fitted over the cylindrical part, but have a border or end face 12a which abuts against the end face of the associated part in end-to-end relationship. They are butt-joined together and they are secured by an encircling ring 13 of a plastic-impregnated glass thread band 13.

FIG. 4 shows a joint similar to that shown in FIG. 3 which may be used whenever two vessel parts are to be joined together in a butt-joint connection. In FIG. 4, a cylindrical wall part 21a is joined, for example, to an end wall part or another cylindrical wall part 21b. FIG. 4 also shows the construction of all of the wall layers of the vessels indicated in FIGS. 1, 3, 5 and 6. Each tank portion, for example, is advantageously made so that there is an inner and outer cover layer 28a and 28b which is of a material to protect against corrosion and there is also provided two radially spaced zones or layers 29a and 29b which are reinforced by glass fiber threads or pieces 56 for the layer 29b and 58 for the layer 29a. These layers are separated by an intermediate layer 30 which contains a plastic bound granular filler, such as sand. The fibers 56 are advantageously such that they extend in the circumferential direction and it is preferable also to ensure that the fibers 58 do likewise. Such fibers are advantageously longer than 5 cm in length and they have a weight percentage in respect to the plastic layer of approximately between 5 and 25%. The ratio of the wall thickness to the diameter is between 0.008 and 0.02.

As shown in FIG. 4, the joint between the parts 21a and 21b is lapped by a winding 23 of a plastic-impregnated glass thread which comprises the bond of the receptacle parts. A suitable tube-connecting sleeve could also be used instead of such a winding band for joining the cylindrical parts 21a and 21b together. As shown in FIG. 5, a vessel 10" comprises only two parts 60 and 62 which together form the circularly cylindrical intermediate wall parts 64a and 64b which include end wall portions 66 and 66'. In this construction, the two assembly parts 60 and 62 are arranged together in end-to-end abutting relationship and they are secured and sealed by an encircling band 23.

An alternate method of forming the whole vessel is shown in FIG. 6. In this construction, end wall parts 70 and 72 are arranged in the respective ends of a rotating mold 33. The end wall part 72 includes a fitting for flange connection 72a which opens into the interior of the vessel. The method shown in FIG. 6 comprises the use of prefabricated end parts 70 and 72 which are arranged in the ends of the mold 33. Thereafter, a long arm or conduit 24 is directed through the opening of the fitting 72a and it is reciprocated backwardly and forwardly in the direction of the arrows 54 to change the position of a nozzle 24b to spray the interior of the mold 33 with a plastic and a plastic and fiber and a plastic and filler composition. While the mold 33 is rotated, the nozzle 24b is reciprocated to apply an even layer in order to form an intermediate circularly cylindrical wall 74 which becomes bonded to and is formed integrally with the end wall portions 70 and 72.

The manufacture of receptacles assembled of several different parts and closed on both ends may also be effected so that after the mounting of one of the end walls, for example, in the manner shown in FIGS. 1 or 3, the structure obtained is lined with a glass fiber mat and subsequently brought into an abrupt upright position with the mounted end wall at the bottom. Thereupon, a predetermined quantity of liquid plastic is poured into the interior of the structure and the upper end wall is fitted thereon. The receptacle is then brought into the horizontal position again and brought into rotation on a suitable centrifugal machine. Owing to the centrifugal effect, the previously introduced plastic impregnates the glass fiber mat and, after setting, a seamless lining is formed covering the entire receptacle.

While specific embodiments of the invention have been shown and described in detail to illustrate the application of the principles of the invention, it will be understood that the invention may be embodied otherwise without departing from such principles.

What is claimed is:

1. A cylindrical receptacle made of fiberglass reinforced plastic, comprising at least two plastic layers spaced from each other and containing glass fiber pieces as reinforcement, a filling layer between said two plastic layers containing a mineral granular material bonded with said plastic material, all of said layers being joined to one another by their own said plastic material, the glass fiber pieces of at least one of said plastic layers being oriented randomly and the glass fiber pieces of at least one other plastic layer being oriented in the circumferential direction.

2. A cylindrical receptacle, according to claim 1, wherein said glass fiber pieces, which are oriented in a circumferential direction, are longer than 5 cm.

3. A cylindrical receptacle, according to claim 1, wherein said receptacle includes an intermediate cylindrical wall and an end wall at each end of said cylindrical wall having a ratio of wall thickness to diameter between 0.008 and 0.02, the weight percentage of said glass fibers being approximately from 5 to 25%.

4. A cylindrical receptacle, according to claim 1, wherein at least one of said layers comprises a single integral structure.

5. A receptacle comprising a circularly cylindrical wall portion, a closing end wall portion connected to each said end of circularly cylindrical wall portion, all of said wall portions being made of a fiber reinforced plastic resin material, said circularly cylindrical wall having at least two radially spaced layers, at least one of which has reinforcing glass fibers pieces therein oriented in a circumferential direction, and an intermediate layer of mineral granular material boned between said radially spaced layers.

6. A receptacle, according to claim 5, wherein said glass fibers are longer than 5 cm and comprising approximately from between 5 and 25% of the weight of their layers, said cylindrical wall having a wall thickness to diameter of between 0.008 and 0.02.

7. A receptacle, according to claim 5, wherein said closing end wall portion at each end comprises a separate part overlapping said circularly cylindrical wall adjacent each end thereof and sealed thereto.

8. A receptacle, according to claim 5, wherein said closing end wall portion comprises a separate end wall portion at each end of said cylindrical wall portion having an end surface abutting the associated end of said cylindrical wall portion, and an encircling band overlapping the marginal portions of said cylindrical wall portion and said closing end wall portion at each end.

9. A receptacle, according to claim 8, including a covering wall covering the interior and exterior of said circularly cylindrical wall.

10. A receptacle, according to claim 5, wherein said cylindrical wall portion is formed integral with a closing end wall portion, said receptacle including two combined cylindrical wall and closing end wall portions which are arranged together in abutting relationship, and an encircling band overlapping said combined wall portions.

11. A receptacle, according to claim 5, wherein said closing end wall portions are separately formed, said circularly cylindrical wall portion comprising a connecting portion between said separately formed wall portions which is centrifugally formed.

* * * * *